(12) United States Patent
Seelamonthula et al.

(10) Patent No.: US 9,472,108 B2
(45) Date of Patent: Oct. 18, 2016

(54) UPDATING AN AIRFIELD LIGHTING SYSTEM WITH AN LED LIGHT SOURCE

(71) Applicant: Honeywell International Inc., Morristown, NJ (US)

(72) Inventors: Raghu Seelamonthula, Bangalore (IN); Sunil Venugopalan, Bangalore (IN); Raghavendra Muniraju, Bangalore (IN); Fazludeen Ruknudeen, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 172 days.

(21) Appl. No.: 14/216,025

(22) Filed: Mar. 17, 2014

(65) Prior Publication Data
US 2015/0262491 A1    Sep. 17, 2015

(51) Int. Cl.
| | | |
|---|---|---|
| G08B 21/00 | (2006.01) | |
| G08G 5/02 | (2006.01) | |
| G08G 5/00 | (2006.01) | |
| B64F 1/20 | (2006.01) | |
| H05B 33/08 | (2006.01) | |
| F21Y 101/02 | (2006.01) | |

(52) U.S. Cl.
CPC ............... *G08G 5/025* (2013.01); *B64F 1/20* (2013.01); *G08G 5/0026* (2013.01); *H05B 33/0803* (2013.01); *H05B 33/0893* (2013.01); *B64D 2203/00* (2013.01); *F21Y 2101/02* (2013.01)

(58) Field of Classification Search
CPC . B64D 2203/00; B64F 1/20; F21Y 2101/02; G08G 5/0026; G08G 5/025
USPC .................................................. 340/953, 972
See application file for complete search history.

(56) References Cited

U.S. PATENT DOCUMENTS

| | | | |
|---|---|---|---|
| 5,806,965 A * | 9/1998 | Deese | F21K 9/135 362/237 |
| 6,556,017 B1 | 4/2003 | Pettersson | |
| 7,342,577 B2 | 3/2008 | Struebel et al. | |
| 7,654,720 B2 | 2/2010 | Glassner | |
| 8,425,076 B2 | 4/2013 | Lockwood et al. | |
| 8,556,448 B2 | 10/2013 | Farchtchian et al. | |
| 8,575,862 B2 | 11/2013 | Dubrovsky | |
| 2002/0140379 A1* | 10/2002 | Chevalier | H05B 33/0803 315/291 |
| 2003/0185005 A1 | 10/2003 | Sommers et al. | |
| 2003/0193807 A1 | 10/2003 | Rizkin et al. | |
| 2005/0030192 A1 | 2/2005 | Weaver et al. | |

(Continued)

FOREIGN PATENT DOCUMENTS

| | | |
|---|---|---|
| EP | 2581311 A1 | 10/2011 |
| WO | 2003023276 A1 | 3/2003 |

OTHER PUBLICATIONS

Search Report from related European Application 15157667.5 dated Jul. 30, 2015 (pp. 7).

*Primary Examiner* — Mark Rushing
(74) *Attorney, Agent, or Firm* — Brooks, Cameron & Huebsch, PLLC

(57) ABSTRACT

Methods and systems for updating an airfield lighting system with an LED light source are described herein. One method includes removing a light source from an existing light fixture of an airfield lighting system, wherein the removed light source is not a light emitting diode (LED) light source, and replacing the removed light source with an LED light source in the existing light fixture without modifying or replacing any other element of the existing light fixture.

16 Claims, 2 Drawing Sheets

(56) References Cited

U.S. PATENT DOCUMENTS

| | | |
|---|---|---|
| 2008/0001782 A1 | 1/2008 | That |
| 2009/0091268 A1 | 4/2009 | Forssen et al. |
| 2009/0303084 A1 | 12/2009 | Tartock et al. |
| 2010/0134046 A1 | 6/2010 | Holder et al. |
| 2010/0314986 A1* | 12/2010 | Gershaw .............. A61B 1/0684 313/46 |
| 2011/0051414 A1* | 3/2011 | Bailey ....................... F21K 9/13 362/235 |
| 2013/0094192 A1 | 4/2013 | De Boeck et al. |
| 2013/0235598 A1 | 9/2013 | Beausoleil |
| 2014/0042923 A1 | 2/2014 | Yu |
| 2014/0072013 A1 | 3/2014 | Ruknudeen et al. |

* cited by examiner

UPDATING AN AIRFIELD LIGHTING SYSTEM WITH AN LED LIGHT SOURCE

TECHNICAL FIELD

The present disclosure relates to methods and systems for updating an airfield lighting system with an LED light source.

BACKGROUND

Airfield lighting systems are designed to provide visual cues and/or signals for an airfield (e.g., runways, approach areas, and/or taxiways of the airfield) in accordance with International Civil Aviation Organization (ICAO) and/or Federal Aviation Administration (FAA) standards. Current airfield lighting systems typically use halogen and/or filament light sources (e.g., halogen and/or filament lamps) to provide these visual cues and/or signals, and as such typically include light fixtures and power systems that are compatible with halogen and/or filament light sources.

Light emitting diode (LED) light sources, however, can be cheaper to operate and/or maintain than halogen and filament light sources. Accordingly, it may be desirable to use LED light sources, instead of halogen or filament light sources, in airfield lighting systems. However, previous approaches for updating airfield lighting systems with LED light sources typically involve the complete replacement of the existing halogen and/or filament light fixtures of the system, which can be difficult and/or expensive.

DETAILED DESCRIPTION

Figure 1A:
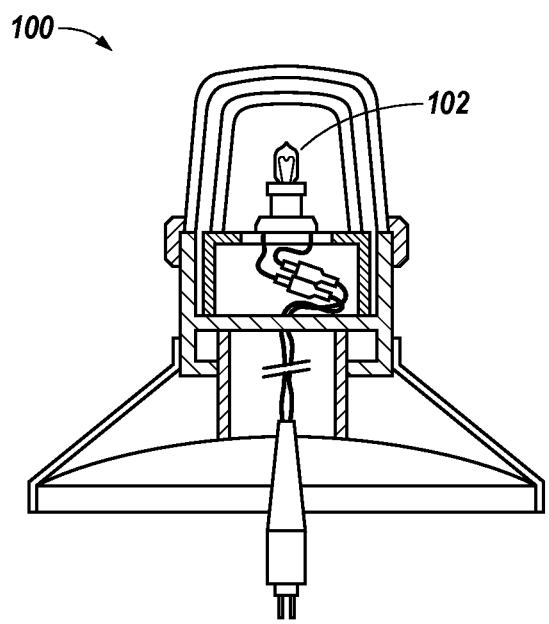
FIG. 1A illustrates an existing light fixture of an airfield lighting system.

Methods and systems for updating an airfield lighting system with an LED light source are described herein. For example, one or more embodiments include removing a light source from an existing light fixture of an airfield lighting system, wherein the removed light source is not a light emitting diode (LED) light source, and replacing the removed light source with an LED light source in the existing light fixture without modifying or replacing any other element of the existing light fixture.

Embodiments of the present disclosure can update an existing light fixture (e.g., a halogen or filament light fixture) of an airfield lighting system with an LED light source without modifying or replacing any element of the existing light fixture other than the light source (e.g., the halogen or filament lamp) of the existing light fixture, and without modifying or replacing the existing power system of (e.g., the system that provides power to) the airfield lighting system. That is, an existing light fixture of an airfield lighting system updated with an LED light source in accordance with the present disclosure can retain all its original elements (e.g., supporting mechanical structure, light housing, optical assembly, etc.), other than the halogen or filament lamp, and can be powered by the existing power system of the airfield lighting system. Accordingly, updating an airfield lighting system with an LED light source in accordance with embodiments of the present disclosure can be cheaper and/or easier than updating an airfield lighting system with an LED light source in accordance with previous approaches (e.g., approaches which involve the complete replacement of the existing light fixtures of the system).

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that mechanical, electrical, and/or process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 104 may reference element "04" in FIG. 1B, and a similar element may be referenced as 204 in FIG. 2.

As used herein, "a" or "a number of" something can refer to one or more such things. For example, "a number of light emitting diodes" can refer to one or more light emitting diodes.

Figure 1B:
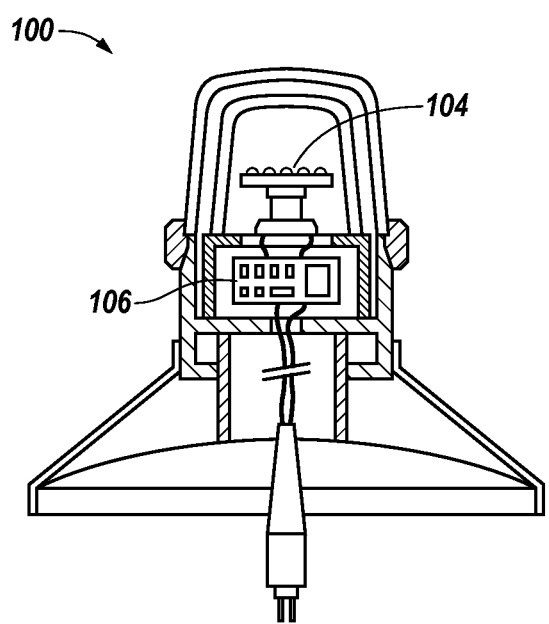
FIG. 1B illustrates the existing light fixture of FIG. 1A updated with a light emitting diode (LED) light source in accordance with one or more embodiments of the present disclosure.

FIG. 1A illustrates an elevated existing light fixture 100 of an airfield lighting system. FIG. 1B illustrates the existing light fixture 100 updated with a light emitting diode (LED) light source in accordance with one or more embodiments of the present disclosure. That is, FIG. 1A illustrates existing light fixture 100 before being updated with an LED light source, and FIG. 1B illustrates existing light fixture 100 after being updated with the LED light source.

Although the existing light fixture illustrated in FIGS. 1A and 1B is an elevated existing light fixture (e.g., a light fixture that includes an elevated light source), embodiments of the present disclosure are not so limited. For example, in some embodiments, the existing light fixture can be an inset light fixture (e.g., a light fixture that includes an inset light source).

As shown in FIG. 1A, existing light fixture 100 can initially (e.g., before being updated) include light source 102. Light source 102 may not be an LED light source. For example, light source 102 can be a halogen or filament light source (e.g., a halogen or filament lamp). That is, existing light fixture 100 can be a halogen or filament light fixture (e.g., a fixture for a halogen or filament light source).

Although not shown and/or labelled in FIG. 1A for clarity and so as not to obscure embodiments of the present disclosure, existing light fixture 100 can also include additional elements such as, for example, a supporting mechanical structure, light housing, and/or optical assembly, among other elements. The optical assembly of existing light fixture 100 can distribute the light emitted by light source 102 into a particular photometric pattern. For example, the optical assembly can distribute the light emitted by light source 102 into a photometric pattern or patterns compliant with International Civil Aviation Organization (ICAO) and/or Federal Aviation Administration (FAA) standards for airfield runways, approach areas, and/or taxiways.

Existing light fixture 100 can be updated with an LED light source by, for example, removing light source 102 from existing light fixture 100, and replacing removed light source 102 with an LED light source 104 in existing light fixture 100, as illustrated in FIG. 1B. LED light source 104 can be, for example, an LED light engine that includes a plurality (e.g., an array and/or cluster) of LEDs, and an optical sub-assembly such as reflectors and/or total internal reflective lenses, as will be further described herein (e.g., in connection with FIG. 3).

Light source 102 can be replaced with LED light source 104 in existing light fixture 100 without modifying or replacing any other element of existing light fixture 100, as illustrated in FIG. 1B. That is, light source 102 can be replaced with LED light source 104 while retaining all other elements (e.g., the supporting mechanical structure, light housing, optical assembly, etc.) of existing light fixture 100.

For example, LED light source 104 can replace light source 102 in existing light fixture 100 without any modification to the optical assembly or light housing of existing light fixture 100. As such, the optical assembly of existing light fixture 100 can distribute the light emitted by LED light source 104 into the same photometric pattern(s) as before existing light fixture 100 was updated with LED light source 104 (e.g., as when existing light fixture 100 included light source 102).

In some embodiments, LED light source 104 can be compatible with the existing power system of the airfield lighting system. For instance, LED light source 104 can be powered by and/or communicate via the existing power system of the airfield lighting system. The existing power system of the airfield lighting system may be, for example, a 6.6 Amp constant current power system.

As an example, light fixture 100 can include an addressing device, such as, for instance, an ASD (addressable switch device), compatible with the existing power system of the airfield lighting system that can provide power to LED light source 104. Such a power supply will be further described herein (e.g., in connection with FIG. 2).

In some embodiments, a controller (e.g., drive) 106 for LED light source 104 can be added to existing light fixture 100, as shown in FIG. 1B. Controller 106 can be added to existing light fixture 100 while existing light fixture 100 is being updated with LED light source 104, or after existing light fixture 100 has been updated with LED light source 104. LED light source 104 and controller 106 can be part of (e.g., form) an LED luminary, as will be further described herein (e.g., in connection with FIG. 2).

Controller 106 can be a smart controller (e.g., provide smart functionality) for LED light source 104. For example, in embodiments in which LED light source 104 includes a plurality of LEDs, controller 106 can maintain a constant (e.g., ICAO and/or FAA compliant) luminosity emitted by LED light source 104 upon a failure of one or more of the plurality of LEDs. That is, controller 106 can compensate for the light lost from the failed LED(s) (e.g., by increasing the luminous power emitted by the other LEDs).

As an additional example, controller 106 can, while maintenance is being performed on LED light source 104 (e.g., while LED light source 104 is in maintenance mode), provide an amount of power to LED light source 104 that is enough for the maintenance to be performed but not enough to cause LED light source 104 to emit light. For instance, controller 106 can provide enough power to LED light source 104 so that maintenance can be performed on LED light source 104, but not enough power to cause LED light source 104 to emit light while the maintenance is being performed.

As an additional example, controller 106 can determine the remaining lifetime (e.g., the end of life) of LED light source 104. For instance, controller 106 can determine the remaining lifetime of LED light source 104 based on the operating conditions of LED light source 104. The operating conditions of LED light source 104 can include, for example, the junction temperature of the LEDs of LED light source 104, the ambient temperature of LED light source 104, the drive current associated with LED light source 104, and/or photometric data from LED light source 104.

The junction temperature of the LEDs of LED light source 104 can be the highest temperature of the semiconductor in the LEDs. The ambient temperature of LED light source 104 can be the temperature within light fixture 100 and/or the air temperature outside of light fixture 100. The drive current associated with LED light source 104 can be the current flow associated with the operation of LED light source 104. The photometric data from LED light source 104 can include the luminous flux, luminous intensity, and/or light emission spectrum of LED light source 104. The operating conditions (e.g., junction temperature, ambient temperature, drive current, and/or photometric data) can be sensed by temperature, current, and/or output sensors located within light fixture 100, as will be further described herein (e.g., in connection with FIG. 3).

As an additional example, controller 106 can communicate a failure of LED light source 104 (e.g., a failure of one or more LEDs of light source 104) to a controller (e.g., a main controller) of the airfield lighting system. For instance, controller 106 can include a communication module (not shown in FIG. 1) that can communicate the failure of LED light source 104 to the airfield lighting system controller. Controller 106 can wirelessly communicate (e.g., over a wireless network) the failure of LED light source 104 to the controller of the airfield lighting system, and/or controller 106 can communicate the failure of LED light source 104 to the controller of the airfield lighting system over the power system (e.g. the power lines) of the airfield lighting system (e.g., using power line communication).

As an additional example, controller 106 can communicate the status (e.g., operational status, operating conditions, and/or location) of LED light source 104 to a controller (e.g., a main controller) of the airfield lighting system. For instance, controller 106 can include a communication module (e.g., the communication module that can communicate the failure of LED light source 104) that can communicate the status of LED light source 104 to the airfield lighting system controller. Controller 106 can wirelessly communicate the status of LED light source 104 to the controller of the airfield lighting system, and/or controller 106 can communicate the status of LED light source 104 to the controller of the airfield lighting system over the power system of the airfield lighting system, in a manner analogous to that of the communication of the failure of LED light source previously described herein.

In some embodiments, light fixture 100 can include a user interface (not shown in FIG. 1) that can display the status of LED light source 104 and/or display a notification of a failure of LED light source 104. The user interface can be, for example, a graphical user interface (GUI) that can include a display (e.g., a screen) that can display and/or receive information to and/or from a user (e.g., operator) of light fixture 100. The display can be, for instance, a touch-screen (e.g., the GUI can include touch-screen capabilities). However, embodiments of the present disclosure are not limited to a particular type of user interface.

Figure 2:
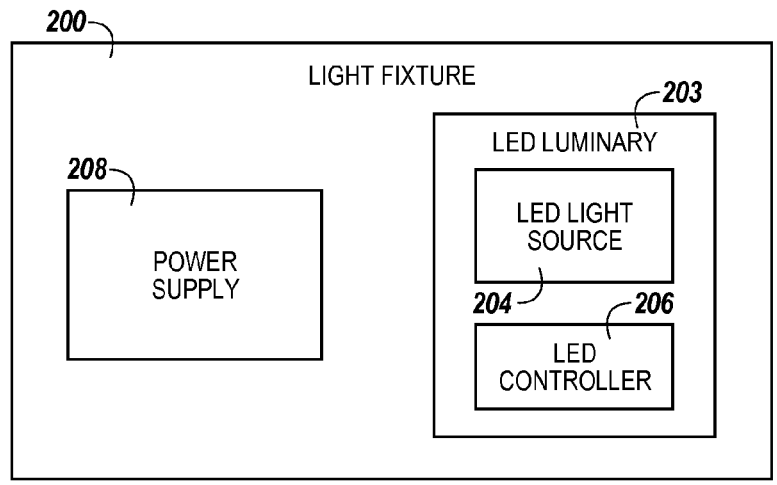
FIG. 2 illustrates a block diagram of a light fixture of an airfield lighting system updated with an LED light source in accordance with one or more embodiments of the present disclosure.

FIG. 2 illustrates a block diagram of a light fixture 200 of an airfield lighting system updated with an LED light source in accordance with one or more embodiments of the present disclosure. Light fixture 200 can be, for example, light fixture 100 previously described in connection with FIGS. 1A and 1B.

As shown in FIG. 2, light fixture 200 can include an LED luminary 203 having an LED light source 204 and an LED controller 206. LED light source 204 and LED controller 206 can be, for example, LED light source 104 and LED controller 106, respectively, previously described in connection with FIG. 1.

For example, LED light source 204 can replace a previously existing light source (e.g., a halogen or filament light source) in light fixture 200, and controller 206 can be added to light fixture 200, as previously described in connection with FIG. 1. Controller 206 can be a smart controller for LED light source 204, as previously described in connection with FIG. 1.

As shown in FIG. 2, light fixture 200 can include a power supply 208 that can provide power to LED luminary 203 (e.g., LED light source 204). Power supply 208 can be compatible with the existing power supply of the airfield lighting system, as previously described in connection with FIG. 1.

Figure 3:
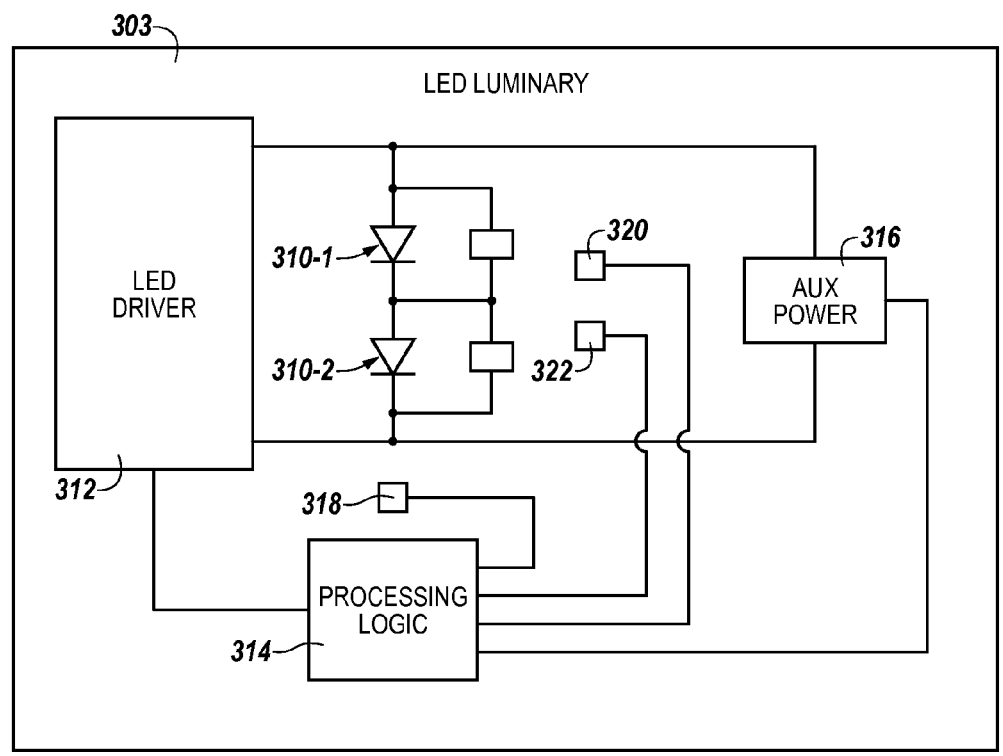
FIG. 3 illustrates a schematic diagram of an LED luminary of a light fixture of an airfield lighting system updated with an LED light source in accordance with one or more embodiments of the present disclosure.

FIG. 3 illustrates a schematic diagram of an LED luminary 303 of a light fixture of an airfield lighting system updated with an LED light source in accordance with one or more embodiments of the present disclosure. LED luminary 303 can be, for example, LED luminary 203 previously described in connection with FIG. 2.

As shown in FIG. 3, LED luminary 303 can include a plurality (e.g., an array and/or cluster) of LEDs (e.g., LEDs 310-1 and 310-2). Although two LEDs are illustrated in FIG. 3, embodiments of the present disclosure are not limited to a particular number of LEDs. The plurality of LEDs can be part of (e.g., form) an LED light source such as LED light source 104 and/or 204 previously described in connection with FIGS. 1 and 2, respectively.

As shown in FIG. 3, LED luminary 303 can include an LED driver 312 coupled to the plurality of LEDs (e.g., LEDs 310-1 and 310-2), and processing logic 314 coupled to LED driver 312. LED driver 312 and processing logic 314 can be part of a controller (e.g., a smart controller) for the plurality of LEDs. For example, LED driver 312 and processing logic 314 can be part of controller 106 and/or 206 previously described in connection with FIGS. 1 and 2, respectively.

As shown in FIG. 3, LED luminary 303 can include an auxiliary power supply 316 coupled to the plurality of LEDs (e.g., LEDs 310-1 and 310-2), LED driver 312, and processing logic 314. Auxiliary power supply 316 can provide power to the plurality of LEDs, LED driver 312, and processing logic 314 that is in addition to the power provided by power supply 208 previously described in connection with FIG. 2.

As shown in FIG. 3, LED luminary 303 can include a current sensor 318, an output sensor 320, and a temperature sensor 322 coupled to processing logic 314. Current sensor 318 can sense the drive current associated with the plurality of LEDs (e.g., LEDs 310-1 and 310-2), output sensor 320 can sense the photometric data from the plurality of LEDs, and temperature sensor 322 can sense the junction temperature and/or the ambient temperature of the plurality of LEDs.

Current sensor 318 and output sensor 320 can be located within the housing of the light fixture proximate to the plurality of LEDs, as illustrated in FIG. 3. In embodiments in which temperature sensor 322 senses the ambient temperature of the plurality of LEDs, temperature sensor 322 can be located within the housing of the light fixture proximate to the plurality of LEDs, as illustrated in FIG. 3, or outside the housing of the light fixture in the ambient air proximate to the housing. In embodiments in which temperature sensor 322 senses the junction temperature of the plurality of LEDs, temperature sensor 322 can be located within the housing of the light fixture proximate to the plurality of LEDs, as illustrated in FIG. 3, or placed on a failure bypass switch (not shown in FIG. 3 for clarity and so as not to obscure embodiments of the present disclosure).

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method of updating an airfield lighting system, comprising:
   removing a light source from an existing light fixture of an airfield lighting system, wherein the removed light source is not a light emitting diode (LED) light source;
   replacing the removed light source with an LED light source in the existing light fixture without modifying or replacing any other element of the existing light fixture, wherein the LED light source includes a plurality of active LEDs; and adding a controller for the LED light source to the existing light fixture, wherein the controller is configured to maintain, upon a failure of one or more of the plurality of active LEDs of the LED light source, a same luminosity emitted by the LED light source as before the failure by increasing a luminous power already being emitted by the other active LEDs of the LED light source that have not failed, and wherein the existing light fixture includes an optical assembly configured to distribute light emitted by the LED light source into a same photometric pattern as before the light source was removed from the existing light fixture and replaced with the LED light source.

2. The method of claim 1, wherein the method includes replacing the removed light source with the LED light source in the existing light fixture while retaining all other elements of the existing light fixture.

3. The method of claim 1, wherein:
the existing light fixture is a halogen light fixture; and
the removed light source is a halogen light source.

4. The method of claim 1, wherein:
the existing light fixture is a filament light fixture; and
the removed light source is a filament light source.

5. The method of claim 1, wherein the LED light source is compatible with an existing power system of the airfield lighting system.

6. An airfield lighting system, comprising:
a light fixture having a light emitting diode (LED) light source and a controller for the LED light source;
wherein the LED light source replaces a halogen light source or a filament light source in the light fixture and the LED light source includes a plurality of active LEDs; and
wherein the controller is configured to maintain, upon a failure of one or more of the plurality of active LEDs, a same luminosity emitted by the LED light source as before the failure by increasing a luminous power already being emitted by the other active LEDs of the LED light source that have not failed; and
wherein the light fixture includes an optical assembly configured to distribute light emitted by the LED light source into a same photometric pattern as before the LED light source replaced the halogen light source or the filament light source in the light fixture.

7. The airfield lighting system of claim 6, wherein the light fixture includes a power supply configured to provide power to the LED light source, wherein the power supply is compatible with a power system of the airfield lighting system.

8. The airfield lighting system of claim 6, wherein the controller is configured to, while maintenance is being performed on the LED light source, provide an amount of power to the LED light source that is enough for the maintenance to be performed but not enough to cause the LED light source to emit light.

9. The airfield light system of claim 6, wherein the LED light source replaces the halogen light source or a filament light source in the light fixture without a modification to the optical assembly or light housing of the light fixture.

10. The airfield lighting system of claim 6, wherein the light fixture includes a user interface configured to display a status of the LED light source.

11. An airfield lighting system, comprising:
a halogen or filament light fixture, wherein the halogen or filament light fixture includes:
a light emitting diode (LED) light source having a plurality of active LEDs, wherein the LED light source replaces a halogen light source or a filament light source in the halogen or filament light fixture;
a controller for the LED light source, wherein the controller is configured to maintain, upon a failure of one or more of the active LEDs of the LED light source, a same luminosity emitted by the LED light source as before the failure by increasing a luminous power already being emitted by the other active LEDs of the LED light source that have not failed; and
an optical assembly configured to distribute light emitted by the LED light source into a same photometric pattern as before the LED light source replaced the halogen light source or the filament light source in the halogen or filament light fixture.

12. The airfield lighting system of claim 11, wherein the controller is configured to determine a remaining lifetime of the LED light source.

13. The airfield lighting system of claim 12, wherein the controller is configured to determine the remaining lifetime of the LED light source based on operating conditions of the LED light source.

14. The airfield lighting system of claim 11, wherein the controller is configured to communicate the failure of the one or more active LEDs of the LED light source to a controller of the airfield lighting system.

15. The airfield lighting system of claim 11, wherein the controller is configured to communicate a status of the LED light source to a controller of the airfield lighting system over a power system of the airfield lighting system.

16. The airfield lighting system of claim 11, wherein the controller is configured to wirelessly communicate a status of the LED light source to a controller of the airfield lighting system.

* * * * *